(12) United States Patent
Kakii

(10) Patent No.: US 10,114,959 B2
(45) Date of Patent: Oct. 30, 2018

(54) INFORMATION PROCESSING APPARATUS, INFORMATION PROCESSING METHOD, AND INFORMATION PROCESSING SYSTEM

(71) Applicant: Hiroshi Kakii, Tokyo (JP)

(72) Inventor: Hiroshi Kakii, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 220 days.

(21) Appl. No.: 15/150,767

(22) Filed: May 10, 2016

(65) Prior Publication Data
US 2016/0342813 A1 Nov. 24, 2016

(30) Foreign Application Priority Data

May 18, 2015 (JP) ................................ 2015-101008

(51) Int. Cl.
*G06F 21/62* (2013.01)
*G06F 21/60* (2013.01)

(52) U.S. Cl.
CPC ........ *G06F 21/604* (2013.01); *G06F 21/6254* (2013.01)

(58) Field of Classification Search
CPC .. G06F 21/604; G06F 21/6254; G06F 21/602; G06F 21/6245
See application file for complete search history.

(56) References Cited

U.S. PATENT DOCUMENTS

| | | | | |
|---|---|---|---|---|
| 9,460,310 B2* | 10/2016 | Butler | ................ | G06F 21/6245 |
| 2004/0015547 A1* | 1/2004 | Griffin | ............... | H04L 12/1827 709/204 |
| 2010/0199098 A1* | 8/2010 | King | .................. | G06F 21/6254 713/182 |

(Continued)

FOREIGN PATENT DOCUMENTS

| | | |
|---|---|---|
| CN | 101399671 A | 4/2009 |
| CN | 101873301 A | 10/2010 |

(Continued)

OTHER PUBLICATIONS

Aug. 3, 2018 Chinese official action in connection with corresponding Chinese patent application No. 201610318357.3.

(Continued)

*Primary Examiner* — Nelson Giddins
(74) *Attorney, Agent, or Firm* — Cooper & Dunham LLP

(57) ABSTRACT

An information processing apparatus includes a first memory that stores a registered identification name of a user who is eligible to use the information processing apparatus and first publishable information indicating whether or not the registered identification name of the user is publishable, circuitry that determines whether the first publishable information indicates that the registered identification name of the user is publishable, and generates usage history information of the user using the registered identification name based on a determination indicating that the registered identification name of the user is publishable or using an anonymized identification name based on a determination indicating that the registered identification name of the user is not publishable, and a second memory that stores the generated usage history information.

9 Claims, 12 Drawing Sheets

(56) References Cited

U.S. PATENT DOCUMENTS

| | | | |
|---|---|---|---|
| 2010/0262836 A1* | 10/2010 | Peukert | G06F 17/30292 713/189 |
| 2011/0078779 A1* | 3/2011 | Liu | G06F 21/31 726/9 |
| 2011/0225114 A1* | 9/2011 | Gotthardt | G06F 21/6245 706/50 |
| 2012/0137367 A1* | 5/2012 | Dupont | G06F 21/00 726/25 |
| 2012/0266250 A1* | 10/2012 | Uhl | G06F 21/6254 726/26 |
| 2014/0280261 A1* | 9/2014 | Butler | G06F 21/6254 707/756 |
| 2015/0007249 A1* | 1/2015 | Bezzi | G06F 21/6254 726/1 |
| 2015/0143532 A1* | 5/2015 | Toffa | H04L 67/30 726/26 |
| 2015/0356257 A1* | 12/2015 | Wright | H04L 9/0894 705/51 |
| 2016/0203336 A1* | 7/2016 | Nambiar | G06F 21/6254 726/26 |
| 2016/0225114 A1* | 8/2016 | Fafara | G06F 19/322 |
| 2016/0239768 A1* | 8/2016 | Jones | G06F 3/0481 |
| 2016/0267227 A1* | 9/2016 | Takeyama | G06F 19/322 |
| 2017/0207916 A1* | 7/2017 | Luce | H04L 9/14 |
| 2017/0353423 A1* | 12/2017 | Morrison | H04L 51/32 |

FOREIGN PATENT DOCUMENTS

| | | |
|---|---|---|
| CN | 102006299 A | 4/2011 |
| CN | 103281180 A | 9/2013 |
| CN | 103686438 A | 3/2014 |
| JP | 2001-175672 | 6/2001 |
| JP | 2014-229039 | 12/2014 |

OTHER PUBLICATIONS

Wenge Chen, "Computer Network", Xi'an Jiaotong University Press, Xi'an, pp. 123-125 (Sep. 30, 2013), and partial translation.

Yanxiong Xiao, "System and Practice of Propagation", Hunan University Press, Changsha, p. 244. (Sep. 30, 2007), and partial translation.

Shangping Dai, "ASP.NET.3.5 Complete Self-Study Manual" Mechanical Industry Press, Beijing, p. 452 (Jan. 31, 2009), and partial translation.

* cited by examiner

FIG. 5

| USER CODE | LOGIN NAME | NAME | HANDLE NAME | PUBLISHED INFORMATION |
|---|---|---|---|---|
| 0001 | ICHIRO SUZUKI | ICHIRO SUZUKI | SUUICHI | NAME |
| 0002 | ANONYMOUS | JIRO OTA | OJJI | UNPUBLISHABLE |
| 0003 | YAMASAN | SABURO YAMAMOTO | YAMASAN | HANDLE NAME |
| 0004 | ANONYMOUS | SHIRO FUNEKI | FUNEYON | UNPUBLISHABLE |

FIG. 7A

| DATE/TIME | USER | EVENT | RESULT |
|---|---|---|---|
| ... | ... | ... | ... |
| 20xx/01/08 10:10 | ICHIRO SUZUKI | LOG IN | SUCCESSFUL |
| 20xx/01/08 10:12 | JIRO OTA | DELETE DATA | SUCCESSFUL |
| 20xx/01/08 10:14 | ICHIRO SUZUKI | REGISTER DATA | SUCCESSFUL |
| 20xx/01/08 10:17 | SABURO YAMAMOTO | TRANSFER DATA | FAILED |
| 20xx/01/08 10:20 | JIRO OTA | REGISTER DATA | SUCCESSFUL |
| 20xx/01/08 10:11 | SHIRO FUNEKI | TRANSFER DATA | SUCCESSFUL |
| ... | ... | ... | ... |

FIG. 7B

| DATE/TIME | USER | EVENT | RESULT |
|---|---|---|---|
| ... | ... | ... | ... |
| 20xx/01/08 10:10 | ICHIRO SUZUKI | LOG IN | SUCCESSFUL |
| 20xx/01/08 10:12 | ANONYMOUS | DELETE DATA | SUCCESSFUL |
| 20xx/01/08 10:14 | ICHIRO SUZUKI | REGISTER DATA | SUCCESSFUL |
| 20xx/01/08 10:17 | YAMASAN | TRANSFER DATA | FAILED |
| 20xx/01/08 10:20 | ANONYMOUS | REGISTER DATA | SUCCESSFUL |
| 20xx/01/08 10:11 | ANONYMOUS | TRANSFER DATA | SUCCESSFUL |
| ... | ... | ... | ... |

FIG. 9

| DATE/TIME | USER | EVENT | RESULT |
|---|---|---|---|
| ... | ... | ... | ... |
| 20xx/01/08 10:10 | ICHIRO SUZUKI | LOG IN | SUCCESSFUL |
| 20xx/01/08 10:12 | ANONYMOUS1265 | DELETE DATA | SUCCESSFUL |
| 20xx/01/08 10:14 | ICHIRO SUZUKI | REGISTER DATA | SUCCESSFUL |
| 20xx/01/08 10:17 | YAMASAN | TRANSFER DATA | FAILED |
| 20xx/01/08 10:20 | ANONYMOUS1265 | REGISTER DATA | SUCCESSFUL |
| 20xx/01/08 10:21 | ANONYMOUS3721 | TRANSFER DATA | SUCCESSFUL |
| ... | ... | ... | ... |

INFORMATION PROCESSING APPARATUS, INFORMATION PROCESSING METHOD, AND INFORMATION PROCESSING SYSTEM

CROSS-REFERENCE TO RELATED APPLICATIONS

This patent application is based on and claims priority pursuant to 35 U.S.C. § 119(a) to Japanese Patent Application No. 2015-101008, filed on May 18, 2015 in the Japan Patent Office, the entire disclosures of which are hereby incorporated by reference herein.

BACKGROUND

Technical Field

The present invention relates to an information processing apparatus, an information processing method, and an information processing system.

Background Art

The information processing apparatuses such as multifunction peripherals (MFPs) and terminals, which may be shared among a plurality of users, record a log of jobs relating to regular operations or a log of accesses to the apparatuses for managing such accesses. The usage history information, such as the logs described above, is stored along with user identification of the log-in user, and may be later browsed by an auditor as needed.

Depending on a policy of organizations such as corporations, universities, or public offices, names or employee numbers that can identify an individual are included in the user identification in many cases. Since it is assumed that the auditor is thoroughly reliable, regardless of purposes of using the usage history information, users' identification including user's privacy information are included in the usage history information as is.

It cannot be a problem as long as the information processing apparatuses are operated with the aim of auditing security under control of the reliable auditors. In reality, however, the apparatuses are operated under environment, with less security threat from outside, or with the purpose of understating general usage as opposed to ensuring security, such that it is not always necessary to identify a user. Further, the apparatuses are often operated by general system administrators not the professional auditors, or by no administrators. Under those circumstances, if the user identification that can include privacy information are included in usage history information, it can be a risk if the usage history information is leaked to outside due to inadequate management.

SUMMARY

Example embodiments of the present invention provide a novel information processing apparatus that includes a first memory that stores a registered identification name of a user who is eligible to use the information processing apparatus and first publishable information indicating whether or not the registered identification name of the user is publishable, circuitry that determines whether the first publishable information indicates that the registered identification name of the user is publishable, and generates usage history information of the user using the registered identification name based on a determination indicating that the registered identification name of the user is publishable or using an anonymized identification name based on a determination indicating that the registered identification name of the user is not publishable, and a second memory that stores the generated usage history information.

Further embodiments of the present invention provide a recording medium storing an information processing program, and an information processing system.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is a diagram illustrating a data structure of a user information table registered in accordance with operations on the user information registration screen in FIG. 3.

FIGS. 7A and 7B are diagrams illustrating a data structure of a log stored in a log storage device by the operation of generating a log based on a setting whether or not the log is publishable as the embodiment of the present invention.

FIG. 9 is a diagram illustrating a data structure of a log stored in a log storage device by the operation of generating a log based on a setting whether or not the log is publishable as the embodiment of the present invention.

Figure 1:
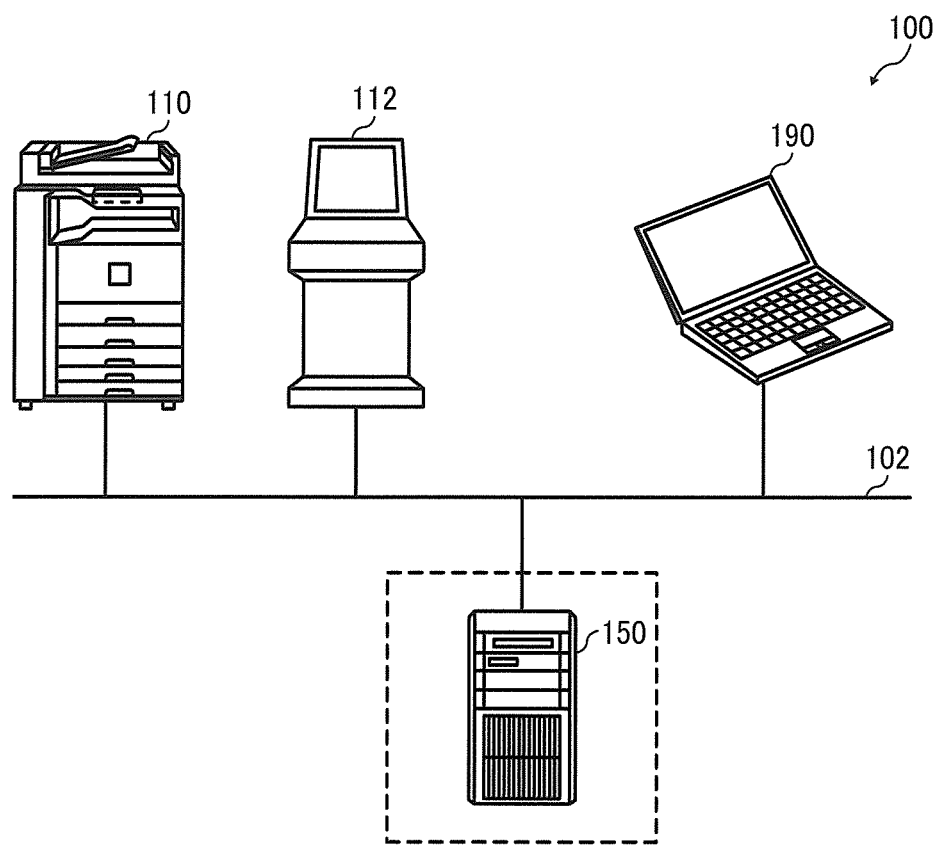
FIG. 1 is a diagram illustrating a log management system as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

In the embodiments described below, an information apparatus and a log management system 100 are described as examples of the information processing apparatus and the information processing system.

FIG. 1 is a diagram illustrating a log management system in this embodiment. In the log management system 10 illustrated in FIG. 1, a user is considered as an operator, and the log management system 100 includes an MFP 110 and an information terminal 112 as information apparatuses that store user's usage history information (hereinafter referred to as "log" simply).

The MFP 110 is the information apparatus that provides various image processing services such as print, scan, copy, and facsimile etc. to users. The information terminal 112 is the information apparatus that provides various services such as government services and a service of selling movie tickets and concert tickets etc. to users.

In FIG. 1, the MFP 110 and the information terminal 112 are illustrated as examples of the information apparatuses operated by users. However, the information apparatuses operated by users are not particularly limited to those apparatuses. Other embodiments of information apparatuses to be shared by multiple users including, but not limited to, an image forming apparatus such as a laser printer, an image scanning apparatus such as a scanner, an image communication apparatus such as a facsimile machine, an image projecting apparatus such as a projector, an image displaying apparatus, a server apparatus, an remote conference terminal, an electronic whiteboard, a portable information terminal, an image capturing apparatus, a vending machine, medical equipment, a power supply apparatus, an air-conditioning system, a measuring apparatus to measure such as gas, water, and electricity, and a network home appliance such as a refrigerator and a washing machine.

FIG. 1 further illustrates an auditor terminal 190 operated by an auditor who audits the information apparatuses such as the MFP 110 and the information terminal 112 etc. The auditor terminal 190 may be implemented by the general-purpose computer or a mobile information terminals, such as a desktop computer, a laptop computer, or a tablet computer etc.

The MFP 110, the information terminal 112, and the auditor terminal 190 are respectively connected to a network 102 to be communicable with one another via the network 102. The network 102 is not limited to a particular example, and the network 102 can include at least either one of a local area network (LAN) and the Internet that are wired, wireless, or mixture of wired networks and wireless networks.

In the information apparatuses such as the MFP 110 and the information terminal 112 illustrated in FIG. 1, as described above, logs such as job logs of regular operations by users and access logs for managing accesses are recorded. The auditor can access the information apparatuses such as the MFP 110 and the information terminal 112 by operating the auditor terminal 190 to browse the logs stored in the information apparatuses.

In the logs described above, contents of operation and contents of execution are recorded along with user identification obtained through login processing. Depending on a policy of organizations, it is possible that login names that include names and employee numbers that can identify an individual are used as the user identification in some cases. It is possible that some users do not want that information for identifying an individual to be included in the logs. On the other hand, if the information that can identify the user is not completely included, it is difficult that the auditor trances the logs at a later date.

To cope with this issue, in the log management system 100 in this embodiment, the information apparatuses such as the MFP 110 and the information terminal 112 etc. preliminarily stores registered identification such as names of authorized users and disclosure information that defines whether or not the registered identification are publishable, i.e., whether or not it is possible to publish the registered identification. Subsequently, in generating the logs, either the registered identification allowed to be disclosed in the disclosure information described above or an anonymized identification if the registered identification is not allowed to be disclosed in the disclosure information described above is considered as the user identification name to generate and store the logs.

As a result, it is possible to reduce a risk of leaking the identification that is not allowed to be disclosed and store the logs that can be traced using the user identification.

Figure 2:
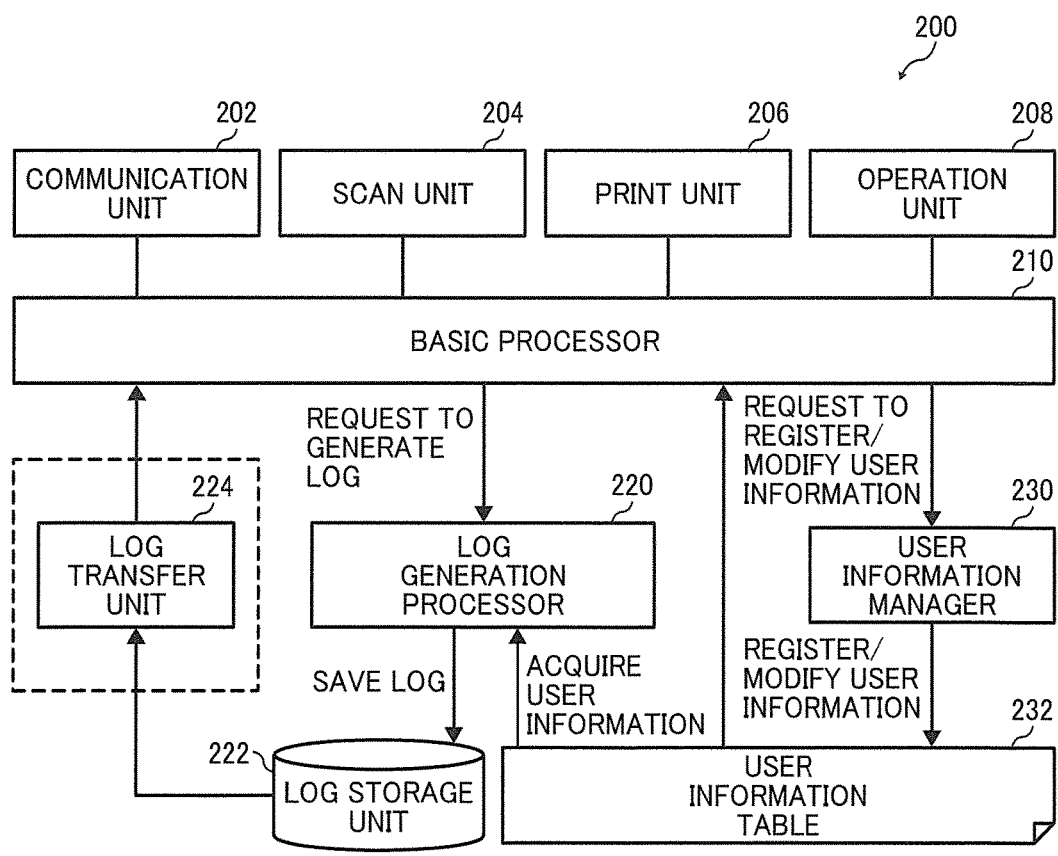
FIG. 2 is a diagram illustrating functional blocks of an MFP of the system of FIG. 1, as an embodiment of the present invention.

Configuring whether or not the logs can be disclosed using the registered identification name and the function of generating the logs based on the configuration whether or not the log can be disclosed implemented by the log management system 100 in a first embodiment is described below with reference to FIGS. 2 to 7. FIG. 2 is a diagram illustrating a functional block 200 of the MFP 110 in the first embodiment. In the below description, the MFP 110 is described as the representative of the information apparatus. However, regarding information apparatuses other than the MFP 110, it is possible to implement the information apparatus adding functional blocks to the functional block 200 or deleting functional blocks from the functional block 200 in FIG. 2 appropriately.

The functional block 200 of the MFP 110 in FIG. 2 includes a communication unit 202, a scan unit 204, a print unit 206, an operation unit 208, a basic processor 210, a log generation processor 220, and a user information manager 230. Furthermore, FIG. 2 also illustrates a log storage unit 222 and a user information table 232.

The communication unit 202 includes a network interface card (NIC) etc. and connects the MFP 110 to the network 102. In this embodiment, the communication unit 202 receives a request to browse the logs from application on the auditor terminal 190, such as a browser and a management tool etc. and returns the logs in response to the request. The scan unit 204 includes an image scanning circuit and performs an operation of scanning an image in image processing services such as copy service and scan service, etc. The print unit 206 includes an image forming circuit and performs an operation of forming an image in image processing services such as copy service and print service, etc. The operation unit 208 includes a touch panel etc. operated by a user of the MFP 110 and provides a user interface (UI) that accepts various user operations such as login operation, a command to execute a job, and logout operation etc. The basic processor 210 controls the whole MFP 110 to perform basic functions of the MFP such as the communication unit 202, the scan unit 204, the print unit 206, and the operation unit 208 etc.

In FIG. 2, the MFP 110 that includes the communication unit 202, the scan unit 204, the print unit 206, and the operation unit 208 is illustrated as the example. The configuration included in the information apparatus is not limited to that particularly. For example, the information apparatus can include other functional blocks such as a facsimile etc. Otherwise, the information apparatus may not include a part of the functional blocks described above. Consequently, the information apparatus can include appropriate functions in accordance with specific purposes and specific product design etc.

The basic processor 210 requests the log generation processor 220 to generate the log if a predetermined event that the log is to be recorded occurs. For example, if operations such as the login operation, job execution operation, and logout operation are input on the operation unit 208 by user operation, the basic processor 210 issues the request to generate log corresponding to login, job execution, and logout. In addition, if an error occurs in the communication unit 202, the scan unit 204, or the print unit 206 etc., the basic processor 210 issues the request to generate log corresponding to the occurred error to the log generation processor 220.

The log generation processor 220 generates log in association with the login user identification name in response to the request to generate log by the basic processor 210 and stores the log in the log storage unit 222. The log storage unit 222 stores various logs generated based on various operations and events on the MFP 110, and the log storage unit 222 is configured as a storage unit (memory) that stores a log generated by the log generation processor 220 in this embodiment. It should be noted that the associated user identification name is described in detail later.

The user information manager 230 manages user information regarding generating log, writes the user information in the user information table 232, and reads the user information from the user information table 232. The user information manager 230 modifies content of the user information table 232 in response to requests to register and modify the user information by user operation via the operation unit 208.

The user information table 232 is managed by the user information manager 230 and stores the user information regarding the log generation. In this embodiment, in the request to register or modify the user information, a selection whether or not the registered identification names such as names and employee numbers etc. is publishable in included. The user information table 232 stores registered identification names and disclosure information defining whether or not the registered identification name is publishable for each of equal to or more than one users who are eligible for using the MFP 110. The user information table 232 functions as a storing unit (memory) in this embodiment.

In this embodiment, the user's name is used as the registered identification name. However, the registered identification is not limited to that case. For example, in other embodiments, whatever information such as the employee number, membership number, customer identifier account identifier, e-mail address, and telephone number etc. that can identify a specific user can be used as the registered identification name.

The operation of registering or modifying user information performed by the user information manager 230 is described below with reference to a graphical user interface (GUI) in FIG. 3, a flowchart in FIG. 5, and a data structure of the user information table in FIG. 5.

Figure 3:
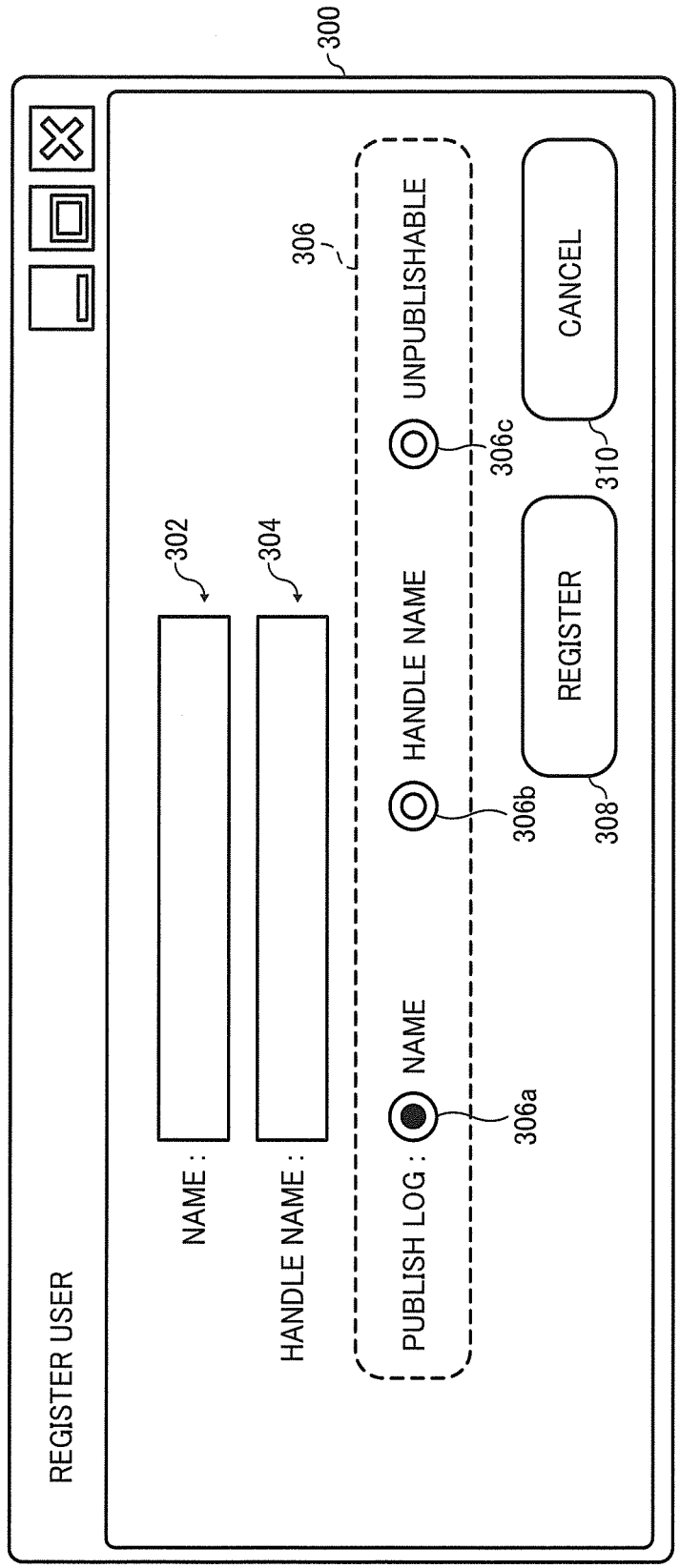
FIG. 3 is a diagram illustrating a user information registration screen displayed on a control panel of the MFP of FIG. 2.

FIG. 3 is a diagram illustrating a user information registration screen displayed on the operation unit 208 of the MFP 110 in the first embodiment. While the user information registration screen for registering a new user is illustrated in FIG. 3, it is possible that the user information modification screen for modifying the user registration is implemented using the similar configuration.

The user information registration screen 300 in FIG. 3 includes a text box 302 that the user inputs his/her name, a text box 304 that the user inputs his/her handle name, a radio button 306 that the user selects which information is disclosed in logs, a registration button 308, and a cancel button 310. The radio button 306 in FIG. 3 includes a "name" radio button 306a that selects whether or not the name is disclosed in logs, a "handle name" radio button 306b that selects whether or not the handle name is disclosed in logs, and a "unpublishable" radio button 306c that selects both the name and the handle name are not disclosed in logs.

If the registration button 308 is pressed after inputting information in the text boxes 302 and 304 and selecting the "name" radio button 306a, it is configured that the user allows to disclose his/her name as the user identification name. By contrast, if the registration button 308 is pressed after selecting the "handle name" radio button 306b, it is configured that the user disagrees with disclosing his/her name and allows to disclose his/her handle name as the user identification name. Furthermore, if the registration button 308 is pressed after selecting the "unpublishable" radio button 306c, it is configured that the user disagrees with disclosing both his/her name and his/her handle name. In this case, neither the name nor the handle name is not used as the user identification name, and a string such as "Anonymous" that indicates the user is anonymized is configured.

In this embodiment, the name is the registered identification name controlled whether or not it is publishable in the first place. The handle name is a false name controlled whether or not it is publishable in the second place if it is selected that the name is unpublishable. While the false name does not satisfy anti-connectivity, the false name has anonymity since it is impossible to specify a user uniquely, and the false name is included in the anonymized identification name in these embodiments. Since the same string that indicates anonymity such as "Anonymous" is given to unspecified majority, that identification name has high anonymity, and that identification name is included in anonymized identification names.

Figure 4:
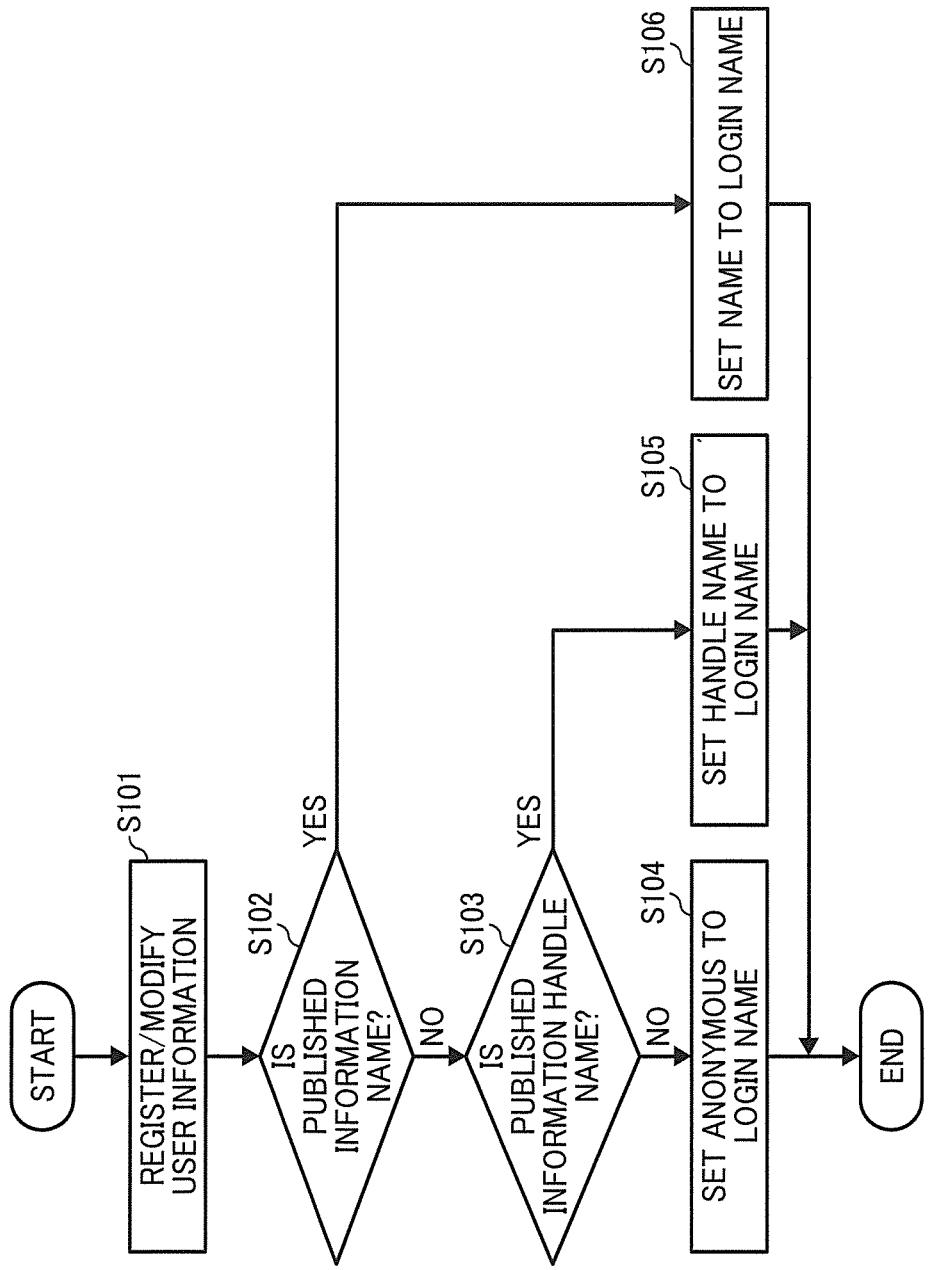
FIG. 4 is a flowchart illustrating an operation of registering and modifying a user performed by the MFP of FIG. 2.

FIG. 4 is a flowchart illustrating the operation of registering or modifying a user performed by the MFP 110 in the first embodiment. The operation in FIG. 4 starts in response to a case that the registration button 308 on the user information registration screen 300 in FIG. 3 is pressed by user operation. In S101, the MFP 110 performs the operation of registering/modifying user information using the user information manager 230. In S101, depending on the content of the user information registration screen 300 in FIG. 3, the user information other than the log name is written in the user information table 232.

FIG. 5 is a diagram illustrating a data structure of the user information table 232 registered in accordance with operations on the user information registration screen 300 in FIG. 3. As shown in FIG. 5, the user information table 232 includes equal to or more than one records including items such as a user code, log name, name, handle name, and published information.

The user code is a unique code allocated to users. In the MFP 110, user processes are managed using the user code. The basic processor 210 in FIG. 2 manages jobs such as a print job and a scan job using the user code and issues the request to generate log to the log generation processor 220 specifying the user code as one of the parameters.

The log name is a user identification name recorded in logs. The name is an item that stores the name as the registered identification name input in the text box 302 on the user information registration screen 300 described above. The handle name is an item that stores the handle name as the false name input in the text box 304 on the user information registration screen 300 described above. The published information stores a value corresponding to the selection on the radio button 306 on the user information registration screen 300 described above. The log name can be modified in accordance with the item value of the published information.

Getting back to FIG. 4, in S102, in the MFP 110, the operation is branched depending on whether or not the input publishable information is "name". In S102, if it is determined that the publishable information is not "name" (NO in S102), the step proceeds to S103. In S103, in the MFP 110, the operation is further branched depending on whether or not the publishable information is "handle name".

In S103, if it is determined that the publishable information is not "handle name" (NO in S103), the step proceeds to S104. In S104, in the MFP 110, the user information manager 230 sets the string "Anonymous" indicating anonymity to the log name of the corresponding user in the user information table 232, and the operation ends.

By contrast, in S103, if it is determined that the publishable information is "handle name" (YES in S103), the step proceeds to S105. In S105, in the MFP 110, the user information manager 230 sets the value stored in the item of the handle name to the log name of the corresponding user in the user information table 232, and the operation ends.

In S102, if it is determined that the publishable information is "name" (YES in S102), the step proceeds to S106. In S106, in the MFP 110, the user information manager 230 sets the value stored in the item of the name to the log name of the corresponding user in the user information table 232, and the operation ends.

In FIG. 5, the user information table 232 that stores four user information is illustrated. In FIG. 5, four users, i.e., Ichiro Suzuki, Jiro Ota, Saburo Yamada, and Shiro Funeki, are registered. Among them, Suzuki considers that it is OK to publish his name and selects the name 306a in the log publish radio button 306 in the user registration. As a result, the published information stores the value of "name". Ota and Funeki consider that they do not want to publish neither their names nor their handle names and select the unpublishable 306c in the user registration. As a result, their published information stores the value of "unpublishable". Yamada considers that it is OK to publish his handle name and selects the handle name 306b in the log publish radio button 306 in the user registration. As a result, the published information stores the value of "handle name".

In this case, as shown in FIG. 5, since Suzuki selects to publish his name, the value of name item "Ichiro Suzuki" is copied to the log name. Since Ota and Funeki select not to publish their names, "Anonymous" indicating anonymity is set, and the value of handle name "Yamasan" as the false name is copied in the case of Yamada.

As described above, depending on the operation in registering/modifying user, the registered identification name (name) in case of allowing to be published, the false name (handle name) in case of allowing to be published, and publishable information defining whether or not the registered identification name is publishable and the false name is publishable are stored in the user information table 232. Regarding users who do not allow to publish both the registered identification name and the false name, the string "Anonymous" is configured as the user identification name for the users and stored in the user information table 232.

Figure 6:
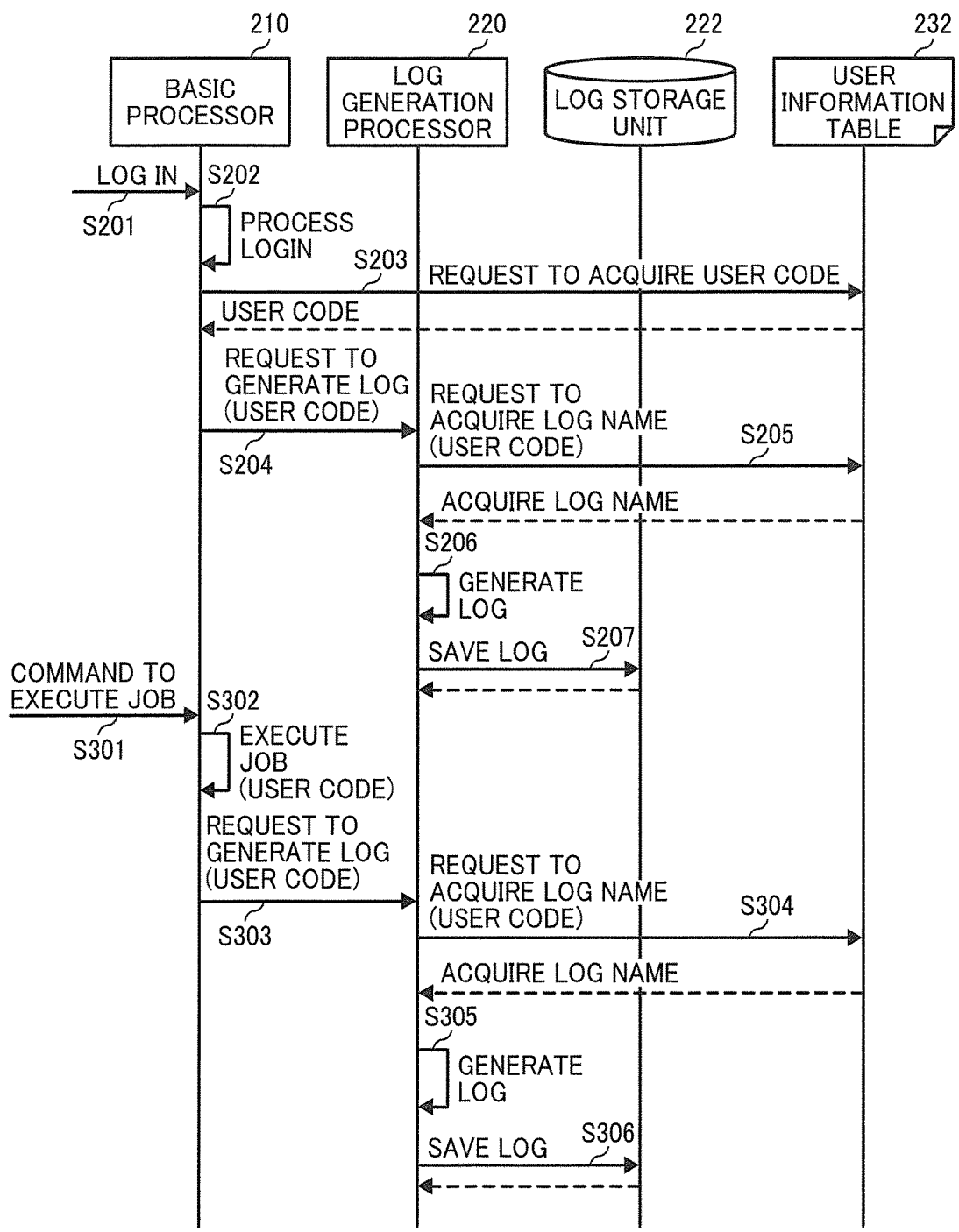
FIG. 6 is a sequence diagram illustrating an operation of generating a log in authenticating login and executing a job performed by the MFP of FIG. 2.

Here, an operation of generating a log based on the setting of whether or not the registered identification name can be published in the log is described below in detail with reference to FIG. 6. FIG. 6 is a sequence diagram illustrating an operation of generating a log in authenticating login and executing a job performed by the MFP 110 in the first embodiment. An operation of generating a log in authenticating login is illustrated in steps S201 to S207. An operation of generating a log in executing a job after authenticating login is illustrated in steps S301 to S306.

The operation in FIG. 6 starts from S201 after logging in using the operation unit 208 by user operation. In S201, the basic processor 210 accepts the login operation via the operation unit 208 by user operation. In S202, the basic processor 210 authenticates the user based on the authentication information such as the login name and password input in the login operation. In this case, it is assumed that the user authentication succeeded.

In S203, the basic processor 210 requests the user information table 232 to obtain the user code used for the login operation and acquires the user code. The obtained user code is used for managing the user process until the user is logged out. In S204, to record a log for the login operation this time, the basic processor 210 requests the log generation processor 220 to generate a log along with the user code.

In S205, the log generation processor 220 requests the user information table 232 to obtain the log name corresponding to the user code and acquires the log name. In S206, the log generation processor 220 generates a log using the obtained log name and stores the generated log in the log storage unit 222.

In addition, an operation of executing a job after logging in is illustrated in FIG. 6. The operation shown in FIG. 6 starts from S301 after commanding to execute a job using the operation unit 208 of the MFP 110 by user operation. In S201, the basic processor 210 accepts the job execution operation via the operation unit 208 by user operation. In S302, the basic processor 210 executes the requested job. In this case, it is assumed that the requested job is executed successfully. In S303, to record a log indicating that the job is executed successfully this time, the basic processor 210 requests the log generation processor 220 to generate a log along with the user code.

In S304, the log generation processor 220 requests the user information table 232 to obtain the log name corresponding to the user code and acquires the log name. In S305, the log generation processor 220 generates the log using the obtained log name and stores the generated log in the log storage unit 222.

FIGS. 7A and 7B are diagrams illustrating a data structure of a log stored in the log storage unit 222 by the operation of generating a log based on a setting whether or not the log is publishable in the first embodiment. FIG. 7A is a diagram illustrating a log assuming that all users allow to publish their names (i.e., the setting whether or not the log is publishable is not configured). By contrast, FIG. 7B is a diagram illustrating a log generated by using the user information table 232 in FIG. 4.

The log consists of equal to or more than one records including date/time when the log is generated, user's log names, events, and results. By comparison with FIG. 7A and FIG. 7B, it is obvious that Ichiro Suzuki's processes are traceable since that log is the same as the normal log. Saburo Yamada's processes are traceable using the handle name.

As described above, the log generation processor 220 generates the log using either the registered identification name (name) allowed to be published by the publishable information or the anonymized identification name (handle name or the string "Anonymous") not allowed to be published by the publishable information as the user identification name.

As a result, it is possible to reduce a risk of leaking the identification names that is not allowed to be disclosed and store the logs that can be traced using the user identification names to a certain degree. That is, instead of publishing the registered identification names such as the names, it is possible to trace processes corresponding to the users in the log. Furthermore, since the generated log itself does not include the identification name not allowed to be published, even if the log is backed up or duplicated by other methods, it is possible to prevent the identification name not allowed to be published from being leaked due to failure of managing the backup log.

In the first embodiment described above, the users who do not allow to publish both the registered identification name and the false name are recorded using the same string in the log. For example, in FIGS. 7A and 7B, Jiro Ota and Shiro Funeki are recorded using the string "Anonymous". As a result, it is possible that it is difficult to determine whether or not data deletion at 10:12, data registration at 10:20, and data transfer at 10:21 are sequential operations.

To cope with this issue, a second embodiment that it is possible to precisely trace sequential operations by users who do not allow to publish both the registered identification name and the false name is described below with reference to FIGS. 8 and 9. Since some part of the second embodiment is in common with the first embodiment, different parts are mainly described below.

Figure 8:
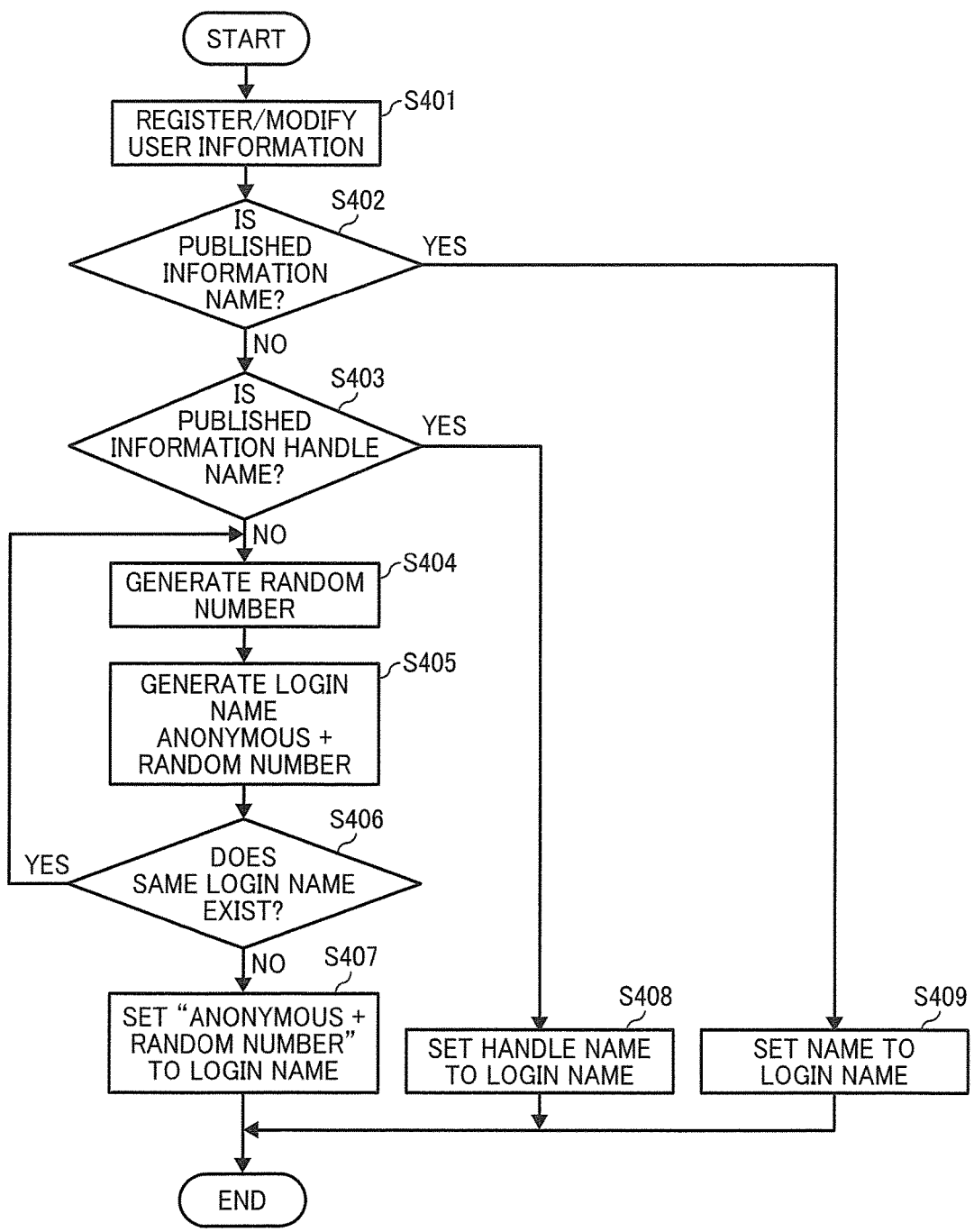
FIG. 8 is a flowchart illustrating an operation of registering or modifying a user performed by the MFP as an embodiment of the present invention.

FIG. 8 is a flowchart illustrating an operation of registering/modifying a user performed by the MFP 110 in the second embodiment. Just like the first embodiment, the operation in FIG. 8 starts in response to a case that the registration button 308 on the user information registration screen 300 in FIG. 3 is pressed by user operation.

In S401, the MFP 110 performs the operation of registering/modifying user information. In S402, in the MFP 110, the operation is branched depending on whether or not the input publishable information is "name". In S402, if it is determined that the publishable information is not "name" (NO in S402), the step proceeds to S403. In S403, in the MFP 110, the operation is further branched depending on whether or not the publishable information is "handle name". In S403, if it is determined that the publishable information is not "handle name" (NO in S403), the step proceeds to S404.

In S404, in the MFP 110, the user information manager 230 obtains a random number code generated by a pseudo random number generator etc. In S405, in the MFP 110, the user information manager 230 adds the random number code generated at random to the string "Anonymous" indicating anonymity and generates the log name for the user. In S406, the MFP 110 determines whether or not the same log name already exists with reference to the user information table 232. If it is determined that the same log name exists (YES in S406), the operation goes back to S404, and the log name using the random number is generated repeatedly until an unregistered log name is generated. In this case, the user information manager 230 implements an identification name generator in this embodiment.

By contrast, if it is determined that the same log name does not exist (NO in S406), the operation proceeds to S407. In S407, in the MFP 110, the user information manager 230 sets the generated string "Anonymous" adding "the random number code" to the log name of the corresponding user in the user information table 232, and the operation ends.

By contrast, if it is determined that the publishable information is "handle name" (YES in S406), the value stored in the item of the handle name is set to the log name of the corresponding user, and the operation ends. By contrast, if it is determined that the publishable information is "name" (YES in S402), the value stored in the item of the name is set to the log name of the corresponding user, and the operation ends.

FIG. 9 is a diagram illustrating a data structure of a log stored in the log storage unit 222 by the operation of generating a log based on a setting whether or not the log is publishable in the second embodiment. In the first embodiment, users who do not allow to publish their names and handle names are recorded as one of unspecified majority, and it is difficult to trace them in logs. By contrast, in the second embodiment, by comparison with FIG. 7A and FIG. 9, it is obvious that the log is recorded in the way that it is even possible to distinguish operations by users who do not allow to publish their names and handle names For example, if a generated random number is "1265", Jiro Ota's log name is set to "Anonymous1265". On the other hand, Shiro Funeki's log name is set to "Anonymous3721" for example. As a result, it is possible to recognize that the data deletion at 10:12 and the data registration at 10:20 are sequential operations and the data transfer at 10:21 belongs to another operation, and it is possible to trace the log precisely.

In the second embodiment, since the log name corresponds to the user on one-on-one basis, it is possible to trace operations in the same way as handle names with higher anonymity compared to the handle names instead of publishing names As a result, in the second embodiment described above, even in case of the users who do not allow to publish both the registered identification name and the false name, it is possible to generate the string that can identify a user uniquely as a log name. Consequently, it is possible to trace logs precisely. However, it could be possible to analogize the relationship between log names and users in the long term. For example, if "Anonymous1265" is recorded as the user identification name in the log whenever Jiro Ota operates the apparatus, it could be possible to analogize that "Anonymous1265" is related to Jiro Ota.

To cope with this issue, a third embodiment that it is possible to trace operations from login to logout and it is difficult to trace operations among logins is described below with reference to FIGS. 10 and 11. Since some part of the third embodiment is in common with the first embodiment, different parts are mainly described below.

Figure 10:
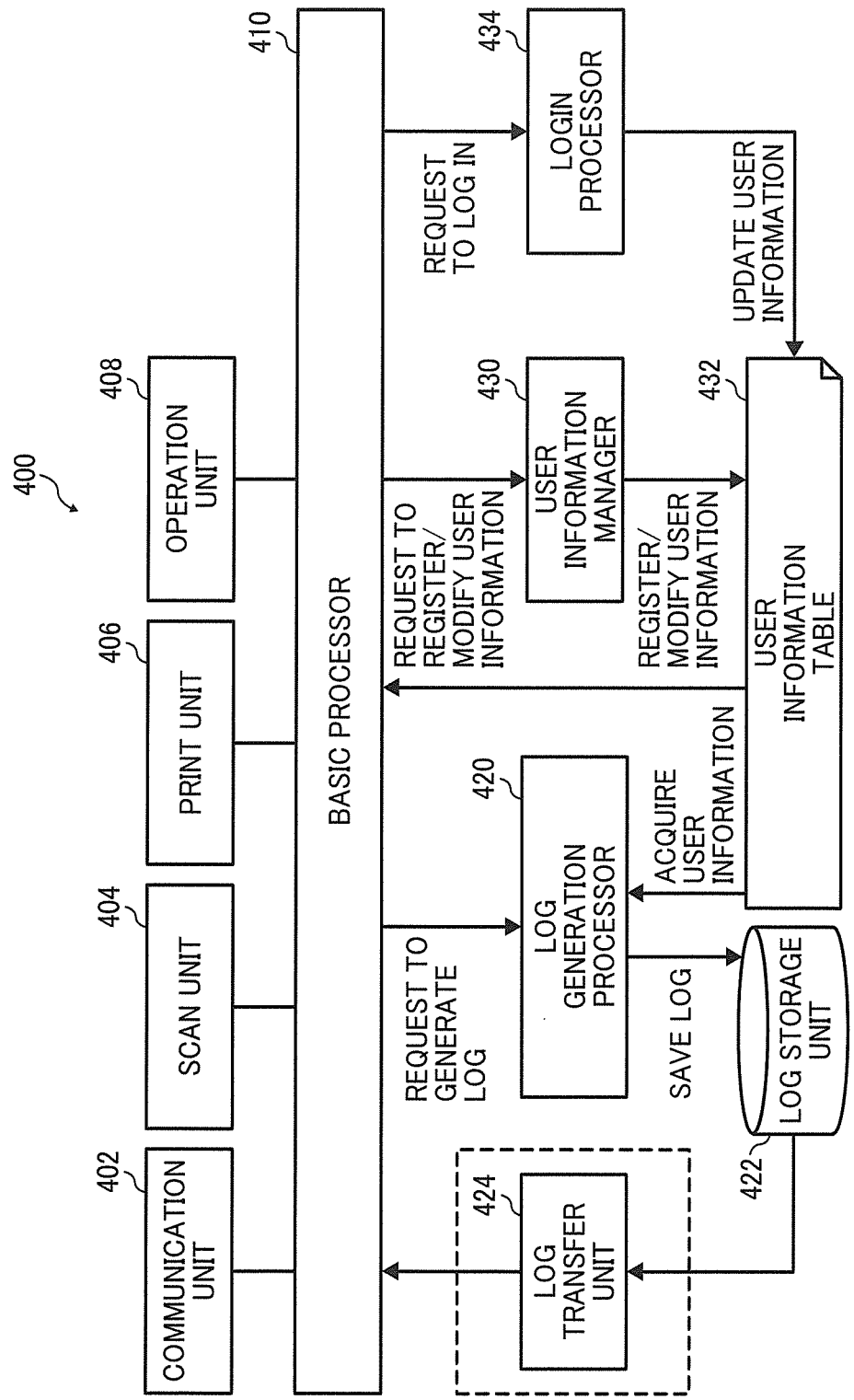
FIG. 10 is a diagram illustrating functional blocks of the MFP as an embodiment of the present invention.

FIG. 10 is a diagram illustrating functional blocks of the MFP 110 in the third embodiment. The functional block 400 of the MFP 110 in FIG. 10 includes a communication unit 402, a scan unit 404, a print unit 406, an operation unit 408, a basic processor 410, a log generation processor 420, a user information manager 430, and a login processor 434. A log storage unit 422 and a user information table 432 are further illustrated in FIG. 10.

In the third embodiment, when it is requested to register/modify user information, if it is selected that both the registered identification name and the false name are unpublishable, the user information manager 430 keeps the log name in the user information table 432 blank.

The login processor 434 controls user authentication in logging in. Known technologies can be used for the user authentication. After logging in, the login processor 434 reads the user information table 432 and checks the publishable information for the login user. If it is selected that both the registered identification name and the false name are unpublishable, the login processor 434 generates a string indicating anonymity using a random number code generated using the pseudo random number generator etc. and updates a log name in the user information table 432. The login processor 434 functions as an identification name generator that generates the string indicating anonymity for each login by user operation in this embodiment.

Figure 11:
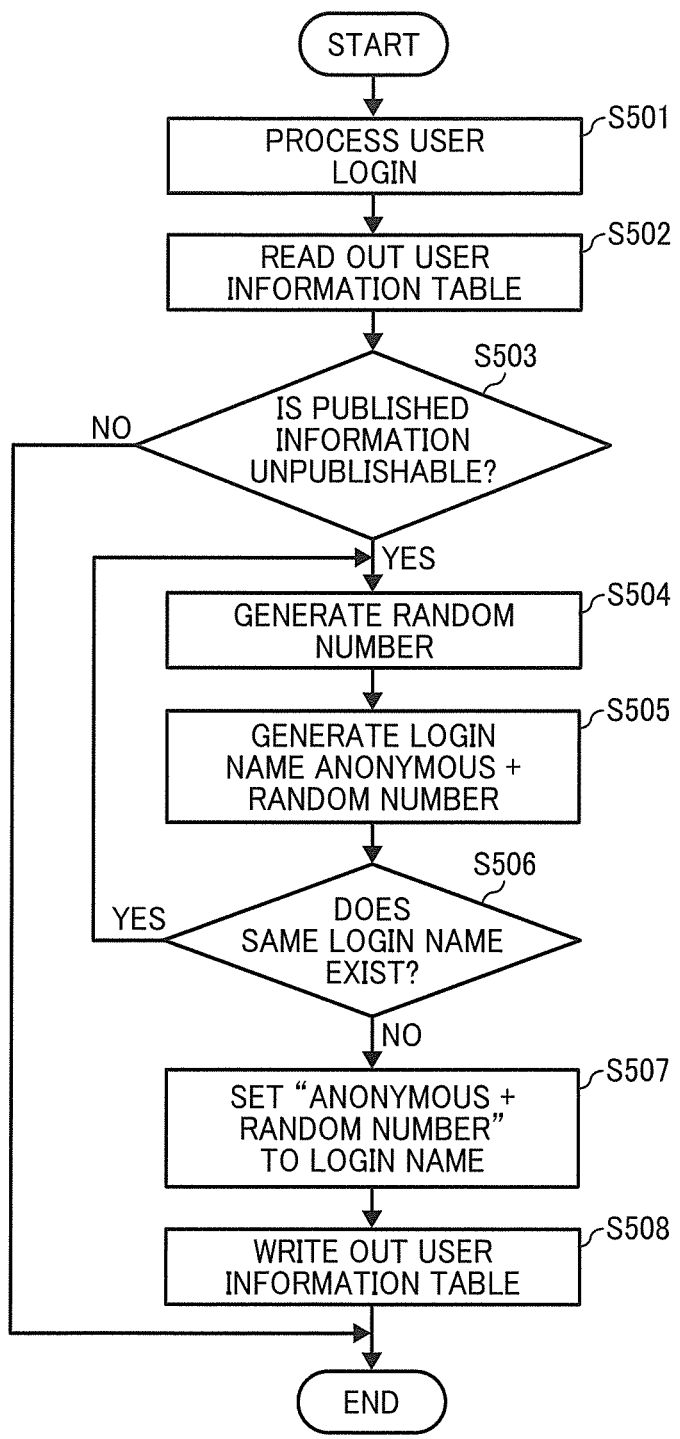
FIG. 11 is a flowchart illustrating an operation of registering or modifying a user performed by the MFP as the embodiment of the present invention.

FIG. 11 is a flowchart illustrating an operation of registering/modifying a user performed by the MFP 110 in the third embodiment. The operation shown in FIG. 11 starts when a login operation is performed via the control panel 408 by user operation. In S501, in the MFP 110, the login processor 434 processes normal login operation by user operation. In S502, in the MFP 110, the login processor 434 reads the user information table 432. In S503, the login processor 434 determines whether or not the login user's publishable information is unpublishable. If it is determined that the publishable information is unpublishable (YES in S503), the operation proceeds to S504.

In S504, in the MFP 110, the login processor 434 obtains a random number code generated by a pseudo random number generator etc. In S505, in the MFP 110, the login processor 434 adds the random number code generated at random to the string "Anonymous" indicating anonymity and generates the log name for the user.

In S506, the MFP 110 determines whether or not the same log name exists with reference to the user information table 432. If it is determined that the same log name exists (YES in S506), the operation goes back to S504, and the log name using the random number is generated repeatedly until an unregistered log name is generated. By contrast, if it is determined that the same log name does not exist (NO in S506), the operation proceeds to S507. In S507, in the MFP 110, the login processor 434 sets the generated log name, i.e., adding the random number code to the string "Anonymous", to the corresponding user's log name. In S508, the configured user information table 432 is written in, and the operation ends. By contrast, if it is determined that the publishable information is not "unpublishable" (NO in S503), the operation ends as is.

In the third embodiment, since the log name corresponds to the user on one-on-one basis, it is possible to trace operations in the same way as handle names with higher anonymity compared to the handle names instead of publishing names. In addition, since the user identification name is modified for each login, it is possible to trace operations only while the process is valid, i.e., only while the user is logging in. Since names recorded in logs are dynamically modified, it is possible to reduce a possibility of associating an individual with a name in the long term even if personal operations are monitored.

In the embodiments described above, the log is browsed by accessing the information apparatuses 110 and 112 directly from the auditor terminal 190. However, in other embodiments, it is possible to connect one or more servers that collect logs from the information apparatuses 110 and 112 and browse the logs by accessing the servers from the auditor terminal 190. FIGS. 1, 2, and 10 illustrate those configurations used in the other embodiments surrounded by broken lines.

In FIG. 1, a log management server 150 used in the other embodiments is illustrated surrounded by broken lines. The information apparatuses such as the MFP 110 and the information terminal 112 transfer its own log to the log management server 150 that uniformly manages log information on a timely basis. In FIGS. 2 and 10, log transfer units 224 and 424 that transfer logs are illustrated. The log transfer units 224 and 424 transfer logs stored in the log storage devices 222 and 422 to the predefined log management server 150 at a predetermined timing such as a predetermined interval or a timing when a predetermined amount of logs are recorded etc. The log transfer units 224 and 424 function as transfer units (transmitters) that transfer logs including anonymized identification names as user identification names if the publishable information does not allow to publish to the external log management server 150.

Figure 12:
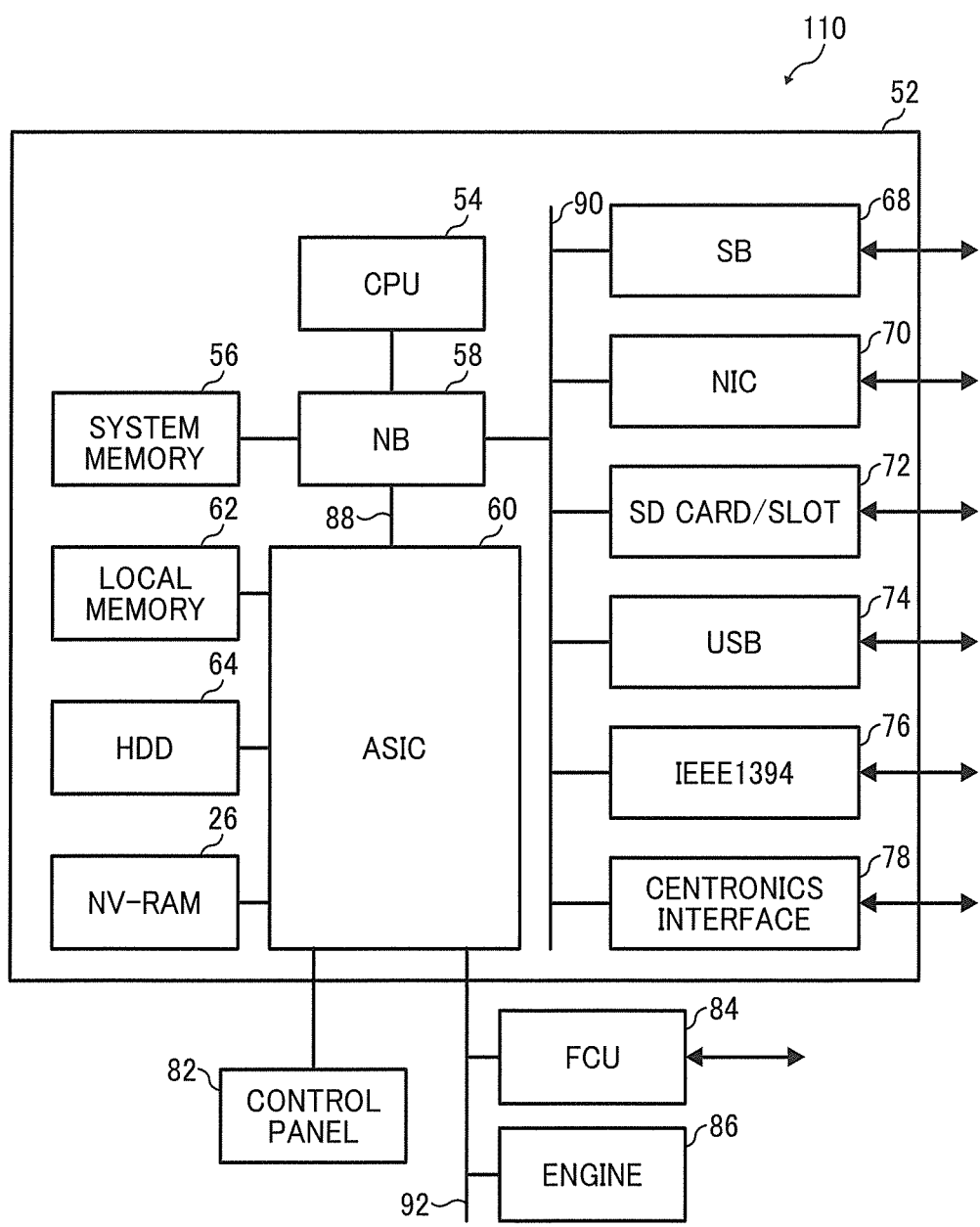
FIG. 12 is a diagram illustrating a hardware configuration of an information apparatus as an embodiment of the present invention.

A hardware configuration of the MFP 110 in the embodiments is described below with reference to FIG. 12. FIG. 12 is a diagram illustrating a hardware configuration of the MFP 110 in this embodiment. The MFP 110 includes a controller 52, a control panel 82, a facsimile control unit (FCU) 84, and an engine 86. The controller 52 includes a CPU 54, a Northbridge (NB) 58, an ASIC 60 connected to the CPU 54 via the NB 58, and a system memory 56. The ASIC 60 processes various images, and the ASIC 60 is connected to the NB 58 via an Accelerated Graphic Port (AGP) 88. The system memory 56 is used as a memory for drawing images etc.

The ASIC 60 is connected to a local memory 62, a hard disk drive (HDD) 64, and a nonvolatile memory (e.g., a flash memory etc.) 66 (hereinafter referred to as "NVRAM 66"). The local memory 62 is used as an image buffer for copying and a code buffer, and the HDD 64 is a storage device that stores image data, document data, programs, font data, and form data etc. The HDD 64 in this embodiment can provide a storage area for the log storage devices 222 and 422 that store logs. When the log is transferred to the external log management server 150, the HDD 64 provides a temporary storage area. The NVRAM 66 stores programs for controlling the MFP 110, various system information, and various setting information.

The controller 52 further includes a Southbridge (SB) 68, a network interface card (NIC) 70, a Secure Digital (SD) card slot 72, a USB interface 74, an IEEE 1394 interface 76, and a Centronics interface 78, and those components are connected to the NB 58 via a PCI bus 90. The SB 68 is a bridge that connects a ROM (not shown in figures) and PCI bus peripheral devices etc. to the NB 58. The NIC 70 is an interface that connects the MFP 110 to the network 102 such as the Internet and a LAN etc., and the NIC 70 accepts commands and requests via the network. An example of a command via the network is a request for remote login. The SD card slot 72 mounts a SD card (not shown in figures) detachably. The USB interface 74, the IEEE 1394 interface 76, and the Centronics interface 78 are interfaces compatible with each standard and accepts a print job etc.

The control panel 82 as a display is connected to the ASIC 60 in the controller 52 to accept various input commands and requests by user operation and provide a user interface for displaying a screen. The control panel 82 can include a display, a keyboard, and a mouse. Otherwise, the control panel 82 can consist of a touch panel. The FCU 84 and the engine 86 are connected to the ASIC 60 via the PCI bus 92. The FCU 84 performs communication methods compatible with facsimile communication specifications such as G3 and G4 etc. After accepting a request for print and a request for scan issued by an application, the engine 86 performs an image forming process and an image scanning process. The engine 86 constructs the scanner and the printer. The MFP 110 in this embodiment reads control programs from the HDD 64 and NVRAM 66 and expands the read control program into a work area provided by the system memory 56 and the local memory 62 to implement the functional units (functional components) and processes described above under control of the CPU 54.

As described above, in this embodiment, the information processing apparatus that can reduce a risk of leaking unpublishable identification names and store usage history information traceable using a user identification name is provided.

By adopting the configurations described above, in accordance with environment where the information apparatus is used, it is possible to configure publishable ranges of privacy information stored in logs by user operation under predetermined operations. Even if the log information is leaked, it is possible to reduce a risk of leaking information that is not allowed to be published by user operation.

In the embodiments described above, it should be noted that each functional component shown in FIGS. 2 and 10 is included in the MFP 110. However, embodiments are not limited to those cases, and it is possible to distribute a part of the functional components described above to one or more computer systems to implement the part of the functional components on those computer systems.

The present invention also encompasses an information processing method performed by an information processing apparatus. The method includes the steps of storing a registered identification name of a user who is eligible to use the information processing apparatus and first publishable information indicating whether or not the registered identification name is publishable in a first memory, generating usage history information using either the registered identification name allowed to be published defined in the first publishable information or an anonymized identification name if it is not allowed to publish the registered identification name defined in the first publishable information, and storing the generated usage history information in a second memory.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

As described above, the present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

What is claimed is:

1. An information processing apparatus, comprising:
a first memory to store, for each registered user amongst one or more registered users, a registered identification name of the registered user who is eligible to use the information processing apparatus and first publishable information indicating whether or not the registered identification name of the registered user is publishable;
circuitry to
determine whether the first publishable information of a specified user indicates that the registered identification name of the specified user is publishable,
generate a random number code in a case of a determination that the registered identification name of the specified user is not publishable, and generate an anonymized identification name constituted by a predetermined string concatenated to the random number code, and
generate usage history information of the specified user using the registered identification name of the specified user in a case of a determination that the registered identification name of the specified user is publishable or using the anonymized identification name constituted by the predetermined string concatenated to the random number code in the case of the determination that the registered identification name of the specified user is not publishable; and
a second memory to store the generated usage history information.

2. The information processing apparatus according to claim 1, wherein the first memory further stores a handle name of the registered user and second publishable information indicating whether or not the handle name of the registered user is publishable in a case that the first publishable information of the registered user indicates that the registered identification information of the registered user is not publishable, and the circuitry uses, as the anonymized identification name, the handle name in a case of a determination indicating that the second publishable information indicates that the handle name is publishable, and uses the predetermined string concatenated to the random number code in a case of a determination that the second publishable information indicates that the handle name is unpublishable.

3. The information processing apparatus according to claim 1, wherein the circuitry generates another anonymized name when the anonymized identification name constituted by the predetermined string concatenated to the random number code has already been stored in the first memory.

4. The information processing apparatus according to claim 2, wherein the registered identification name, the first publishable information, the handle name, and the second publishable information are registered in the first memory as user information of the registered user, and when the user information is registered or modified, the circuitry automatically generates the random number code to be used as a user identification name of the specified user, in a case of a determination that the first publishable information and the second publishable information both indicate not to allow to be published.

5. The information processing apparatus according to claim 1, wherein the circuitry generates the random number code as a user identification name of the specified user every time the specified user is being authenticated.

6. The information processing apparatus according to claim 1, further comprising a user interface to accept a user selection of whether or not to publish the registered identification name.

7. The information processing apparatus according to claim 1, further comprising a transmitter to transmit the usage history information including the anonymized identification name as the user identification name of the specified user to an external apparatus in the case that the first publishable information indicates that the registered identification name is not publishable.

8. A method of processing information, performed by an information processing apparatus, comprising:

storing, for each of one or more registered users, a registered identification name of the registered user who is eligible to use the information processing apparatus and first publishable information indicating whether or not the registered identification name of the registered user is publishable in a first memory;

determining whether the first publishable information of a specified user indicates that the registered identification name of the specified user is publishable;

generating a random number code in a case of a determination indicating that the registered identification name of the specified user is not publishable, and generating an anonymized identification name constituted by a predetermined string concatenated to the random number code;

generating usage history information of the specified user using the registered identification name of the specified user in a case of a determination that the registered identification name of the specified user is publishable or using an anonymized identification name constituted by the predetermined string concatenated to the random number code in the case of the determination that the registered identification name of the specified user is not publishable; and storing the generated usage history information in a second memory.

9. An information processing system comprising the an information processing apparatus, the system comprising:

one or more storage devices, a storage device amongst the one or more storage devices storing, for each registered user amongst one or more registered users, a registered identification name of the registered user who is eligible to use the information processing apparatus and first publishable information indicating whether or not the registered identification name of the registered user is publishable;

an information processing apparatus comprising a processor configured by execution of a program stored in a non-transitory medium to perform a method comprising:

obtaining the first publishable information of a specified user from the storage device and determining whether the first publishable information of a specified user indicates that the registered identification name of the specified user is publishable;

generating a random number code in a case of a determination indicating that the registered identification name of the specified user is not publishable, and generating an anonymized identification name constituted by a predetermined string concatenated to a random number;

generating usage history information of the specified user using the registered identification name of the specified user in a case of a determination that the registered identification name of the specified user is publishable or using the anonymized identification name constituted by the predetermined string concatenated to the random number code in the case of the determination that the registered identification name of the specified user is not publishable; and storing the generated usage history information in the storage device or another storage device amongst the one or more storage devices.

* * * * *